Aug. 18, 1970 YOSHIRO KONAGAYA 3,524,950

STEREOPHONIC PHOTOELECTRIC PICKUP DEVICE

Filed Jan. 6, 1969

YOSHIRO KONAGAYA

INVENTOR.

BY Flynn & Frishauf

Attys 3,524,950

STEREOPHONIC PHOTOELECTRIC PICKUP DEVICE

Yoshiro Konagaya, Shizuoka-ken, Japan, assignor to Tokyo Shibaura Electric Co., Ltd., Kawasaki-shi, Japan, a corporation of Japan Filed Jan. 6, 1969, Ser. No. 789,333
Claims priority, application Japan, Jan. 16, 1968, 43/1,967
Int. Cl. G11b *3/00*
U.S. Cl. 179—100.41 2 Claims

ABSTRACT OF THE DISCLOSURE

This photoelectric pickup device comprises a light source, two light control members for controlling the amount of light beams from said source, a means connected to one of the light control members to pick up recorded signals by tracing the sound groove formed on the surface of a phonographic disk and a means actuated in accordance with the recorded signals thus picked up thereby to detect the two light beams whose amounts have been controlled by said light control members.

The present invention relates to a photoelectric pickup device and more particularly to a photoelectric pickup device wherein improvement has been made in the arrangement of a light control member for regulating the amount of light beams projected on a photoelectric converting element.

A photoelectric pickup device consists of a photoelectric converting means disposed opposite to a light source and a light control member movably positioned between the light source and photoelectric converting means to obstruct part of the projected light. The light control member is a thin metal foil, the end portion of which is so devised as to obstruct part of the light projected from the light source on the photoelectric converting means. Said control member is so designed to increase or decrease the amount of light beams to be obstructed in accordance with the magnitude of frequency of the vibrations of a vibration system provided with a stylus to trace the sound groove of a phonographic disk and connected to the light control member, when said vibrations are caused at the time of tracing by the needle. However, the signals recorded in the sound groove of a phonographic disk have very minute wave forms with the resultant extremely slight vibrations of the vibration system. Accordingly, the light control member utilising only the end portion thereof in controlling the amount of light beams can only vary said amount to a considerably small extent, so that the photoelectric converting element displays a very poor efficiency. Thus it has been extremely difficult to expect fully high sensitivity of the prior art pickup device.

Where such pickup device is used in reproducing the signals of a 45—45 type stereophonographic disk, the signals recorded in both right and left walls of the V-shaped sound groove are separately picked up for conversion to electric signals, followed by amplification. However, the signals recorded in the right and left walls of the sound groove are in the reversed phase relationship, namely, the crest and root of the wave form corresponding to the polarity of signals recorded in one of the walls of the sound groove have an opposite polarity to those of the other wall. Therefore, to pick up these right and left recorded signals as electric ones, it is necessary to reverse the phase of one of the signals so as to coordinate the phase of both of them. With the prior art photoelectric pickup device, it has been difficult to carry out said phase reversal prior to photoelectric conversion, so that the general practice has been to reverse the phase of one of the right and left signals by allowing it to pass through a phase reversing circuit. However the provision of such a phase reversing circuit in the route of one of the signals is not only uneconomical, but also causes both signals to be unbalanced in their properties such as their levels or deformations.

It is accordingly an object of the present invention to provide a photoelectric pickup device which permits light control means to vary the amount of projected light beams to a noticeable extent and a photoelectric converting element to display an increased converting efficiency thereby providing a photoelectric pickup device having a high sensitivity.

Another object of the present invention is to provide a photoelectric pickup device which comprises a non-electric phase reversing means for controlling the amount of light beams projected on the right and left photoelectric converting elements so as to allow said amount to increase or decrease in reverse relationship with respect to the right and left recorded signals thereby to assure the balance of both signals in the subsequent step of issuing electric signals.

Still another object of the present invention is to provide a photoelectric pickup device which is capable of improving the fidelity of the vibrations of a vibration system to the recorded signals by reducing the weight of light control means which constitutes a vibration load to the vibration system involving a means for tracing the groove of a phonographic disk to pick up the recorded signals.

SUMMARY OF THE INVENTION

According to the present invention, there are provided a pair of photoelectric converting means such as a phototransistor in a manner to face a light source and there are also disposed two light control members one after another between the light source and said photoelectric converting means. One of the light control members is fixed and the other is movably fitted to the vibration transmitting member of a vibration system for tracing the sound groove of a phonographic disk to pick up the recorded signals. The two light control members facing the photoelectric converting elements are provided with first and second light transmitting sets, each of the sets comprising at least one slit. Thus when the movable light control member vibrates together with the vibration transmitting member, the light transmitting areas defined by the superposition of the respective slits of both light control members vary, so that the amounts of light beams projected on the photoelectric converting elements through these superposed slits change to a noticeable extent, enabling said converting elements to display an elevated efficiency. Further, the movable light control member is reduced in weight by an extent corresponding to the slits provided, thus improving the fidelity of vibrations of a vibration system to the signals recorded in the groove of a phonographic disk. (Of course, the fixed light control member is reduced in weight due to the provision of similar slits but this reduced weight has no substantial bearing on the aforesaid fidelity of vibrations.)

Both light control members have right and left sets of slits which face the right and left photo-electric converting means and are arranged in a part-lacking V-shape. In one of said sets of the movable light control member, the lower part of each slit is superposed on the corresponding slit of the fixed light control member, whereas in the other set, the upper part of each slit is superposed on the corresponding slit of the fixed light control member, thus when the movable light control member vibrates vertically, the light transmitting areas defined by the superposition of slits of both light control members increase or decrease in reverse relationship between the right and left sets of slits. Thus the wave forms of signals corresponding to the varied amounts of light beams projected on one of the photoelectric converting elements are reversed in phase with respect to the wave forms of signals corresponding to those of the other photoelectric converting element.

The present invention will be more clearly understood from the following description taken in conjunction with the appended drawings, in which.

Figures 1, 2, 3, 4, 5:
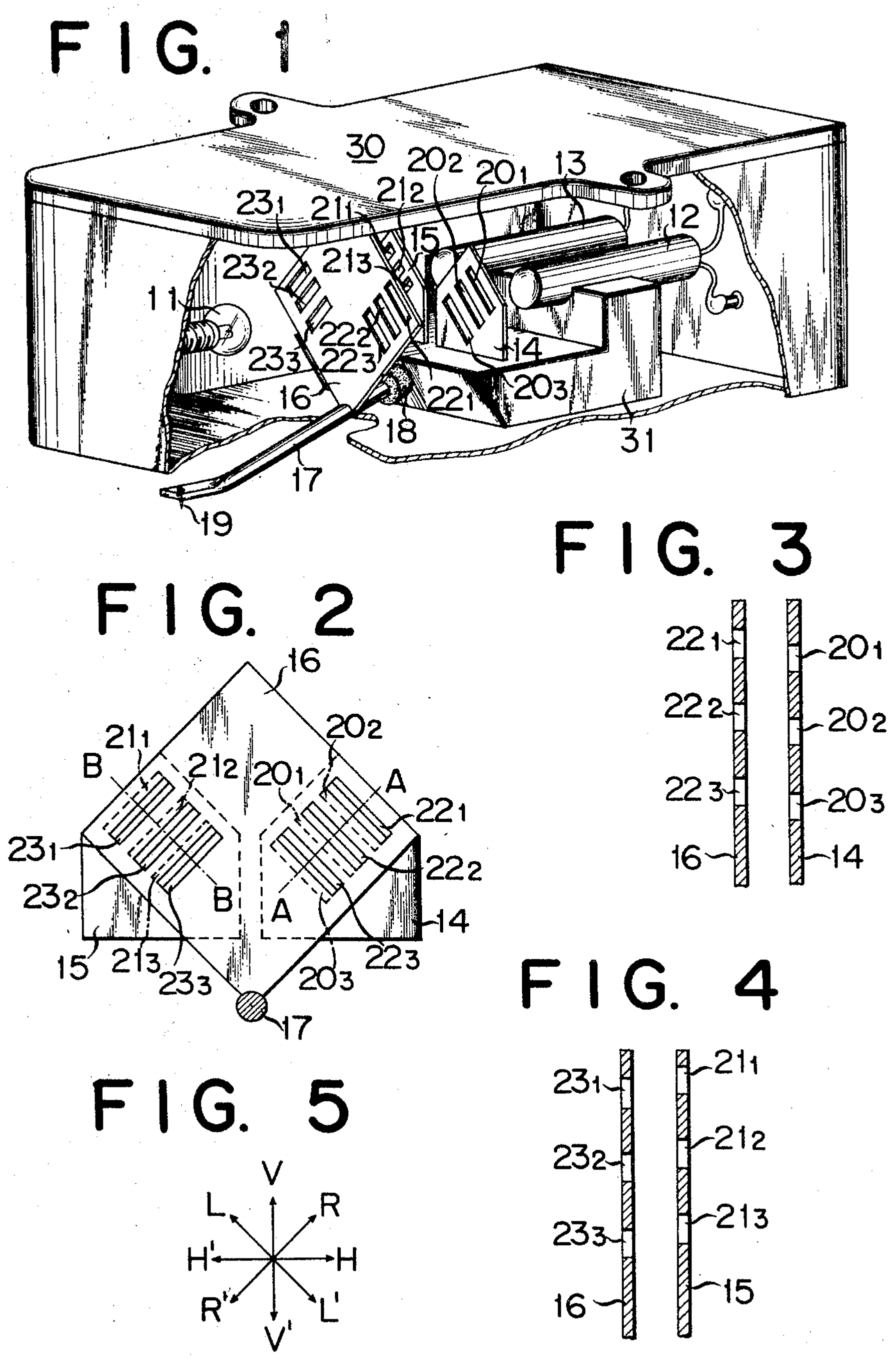
FIG. 1 is a perspective view of a photoelectric pickup device according to the present invention, partly broken away.
FIG. 2 is an elevation showing the relative positions of the first and second light control members of the same.
FIG. 3 is a sectional view on line A—A of FIG. 2.
FIG. 4 is a section on line B—B of FIG. 2.
FIG. 5 shows the directions in which the second light control member is shifted in position.

Referring to FIG. 1, there is provided a light source or lamp 11 on one side wall of a housing 30. Facing the light source are supported a pair of photoelectric converting elements 12 and 13 in parallel relationship on a stand 31 projecting from the bottom wall of the housing 30. Ahead of the photoelectric converting elements 12 and 13 are positioned a pair of first light control members 14 and 15 in parallel relationship. It is possible to form these paired first light control members 14 and 15 integrally with each other. Between the light source 11 and the first light control members 14 and 15 is provided a second light control member 16. This second light control member 16 may also be located between the paired first light control members 14 and 15 and the paired photoelectric converting elements 12 and 13.

Like the light source 11 and photoelectric converting elements 12 and 13, the first light control members 14 and 15 are fixed in the housing 30, while the second light control member 16 is movably set in place. To the stand 31 set up on the bottom wall of the housing 30 is fitted an external vibration transmitting means or cantilever 17, one of whose ends is supported by means of an elastic member 18 such as rubber material in a manner to move vertically as well as horizontally. The second light control member 16 engages with the lever means 17 at an intermediate point in a manner to be set upright above said point. While there is no need to give any particular consideration to the weight of the first light control members 14 and 15, the second light control member 16 should be made of light material in order to reduce the vibration load which said control member 16 applies to the cantilever 17.

The free end of the external vibration transmitting means or cantilever 17 is fitted with a downward projecting vibration transmitting medium or stylus 19 for tracing the sound groove of a phonographic disk to pick up the recorded signals. This vibration transmitting medium 19 and the external vibration transmitting means 17 constitute the vibration system means of the present pickup device.

When the stylus 19 traces the sound groove of a phonographic disk, the cantilever 17 starts vibrating with the portion of said means supported by the elastic brake member 18 serving as a fulcrum.

As shown in FIGS. 1 to 4, when used alone, the first light control members 14 and 15 respectively define the amount of light beams projected from the light source 11 on the photoelectric converting elements 12 and 13. In FIG. 2, one 14 of the first light control members has a light transmitting set consisting of three slits $\mathbf{20_1}$, $\mathbf{20_2}$ and $\mathbf{20_3}$ facing one 12 of the photoelectric converting elements. The other first light control member 15 is made of opaque material but has three slits $\mathbf{21_1}$, $\mathbf{21_2}$ and $\mathbf{21_3}$ facing the other photoelectric converting element 13. In this embodiment, the first light control members consist of metal foil and the slits are formed by a photoetching method. It is of course possible to form the light control members and slits by other means. For instance, the light control members may consist of a transparent film and be coated with opaque material except for the light transmitting means. While each light control member has three slits provided on the right and left sides respectively, the number of each set of slits may be reduced to one or increased to more than three. Further, the slit may assume an elliptic or other forms. The light control member itself may be formed into a comb-shape, instead of being provided with slits.

Like the first light control members, the second light control member 16 when used alone, defines the amount of light beams projected from the light source 11 on the photoelectric converting elements 12 and 13. This second light control member 16 is made of opaque material, but is provided, as shown in FIG. 2, with three slits $\mathbf{22_1}$, $\mathbf{22_2}$ and $\mathbf{22_3}$ facing one 12 of the photoelectric converting elements and another set of three slits $\mathbf{23_1}$, $\mathbf{23_2}$ and $\mathbf{23_3}$ facing the other photoelectric converting element 13. According to this embodiment, the second light control member is provided with many slits (two sets of three slits, namely, $\mathbf{22_1}$–$\mathbf{22_2}$–$\mathbf{22_3}$ and $\mathbf{23_1}$–$\mathbf{23_2}$–$\mathbf{23_3}$), and is extremely reduced in weight. This permits the vibration load applied on the vibration system to be highly reduced, thereby enabling the system to bear great fidelity to the signals recorded in the sound groove of a phonographic disk.

As illustrated in FIG. 2, each slit has a rectangular form. One set of slits formed in one light control member facing the corresponding photoelectric converting element are so arranged that the longitudinal sides of one rectangular form abut those of the adjacent rectangular form. This set of slits and another group of slits facing the other photoelectric converting element are disposed in a V-shape in such a manner that the longitudinal central line of one of these sets intersects that of the other at right angles. Also the slits of both light control members facing the same photoelectric converting element are individually superposed on each other (as $\mathbf{20_1}$ on $\mathbf{22_1}$). Accordingly, when the second light control member 16 vibrates together with the vibration system, there occur variations in the superposed condition (namely, the superposed area) of two opposite slits, for example, $\mathbf{20_1}$ and $\mathbf{22_1}$, on the first and second light control members in accordance with the extent of said vibrations. Thus when the vibration transmitting medium 19 traces the sound groove of a phonographic disk, the vibration system and consequently the second light control member 16 move, as shown in FIG. 5, in the direction of R–R′ or L–L′ in accordance with the right signals recorded in the outer circumferential wall of the V-shaped sound groove or the left signals recorded in the inner circumferential wall of said groove. Where vibrations take place in the R–R′ direction, there occur variations in the area, namely, the effective light transmitting area defined by the superposition of the opposite slits $\mathbf{20_1}$ and $\mathbf{22_1}$ of the first and second light control members 14 and 16 facing one photoelectric converting element 12. In the case of vibrations in the L–L′ direction, there take place changes in the area, namely, the effective light transmitting area defined by the superposition of the opposite slits $\mathbf{21_1}$–$\mathbf{23_1}$ and $\mathbf{21_2}$–$\mathbf{23_2}$ of the first and second light control members 15 and 16 facing the other photoelectric converting element 13. These changes in the superposed areas of the slits cause the amount of light beams projected from the light source 11 through said areas on the photoelectric converting elements 12 and 13 to vary respectively. Such variations are converted to electrical changes by the photoelectric converting elements 12 and 13. Thus where the second light control member 16 moves in the R–R′ direction the right recorded signals are taken out as electric signals from one photoelectric converting element 12 and where the second light control member 16 moves in the L–L′ direction, the left recorded signals are obtained as electric signals from the other photoelectric converting element 13.

In this case, the amount of light beams passing through the areas defined by the superposition of the slits of the first and second light control members are changed in proportion to variations in said superposed areas caused by the displacement of the second light control member 16 due to vibrations. Accordingly, the amount of light beams finally projected on the photoelectric converting elements 12 and 13 is a balance arrived at by deducting from the absolute amount of light beams the total reductions caused at the respective superposed areas. Namely, where the slits of the first and second light control members corresponding to photoelectric converting elements 12 and 13 are allowed to be superposed at an *n* number of points the amount of light beams projected on the photoelectric converting elements is the outcome of causing the absolute amount thereof to be varied to an extent corresponding to *n* times the variation occurring at each superposed area in one displacement of the second light control member 16. This is equivalent to increasing the extent of displacing the second light control member 16*n* fold. Accordingly, even though the second light control member 16 may vibrate only in a very small degree due to the extremely minute wave form of signals recorded in the sound groove of a phonographic disk, the light from the source is projected on the photoelectric converting elements 12 and 13 after being varied to a noticeable extent by the second light control member 16, enabling said elements to carry out conversion with increased efficiency.

The slits of one 14 of the first light control members are superposed on those of the second light control member 16 in a different manner from that in which the slits of the other first light control member 15 are superposed on those of said second light control member 16. As shown in FIG. 2 and more clearly in FIGS. 3 and 4, the lower parts of the slits $22_1$, $22_2$ and $22_3$ of the second light control member 16 which are disposed opposite to the photoelectric converting element 12 are superposed on the corresponding slits $20_1$, $20_2$ and $20_3$ of one 14 of the first light control members. The upper parts of the slits $23_1$, $23_2$ and $23_3$ of the second light control member 16 which are positioned opposite to the other photoelectric converting element 13 are superposed on the corresponding slits $21_1$, $21_2$ and $21_3$ of the other first light control member 15.

The right and left signals recorded in the sound groove of a 45—45 type stereophonographic disk now in practical use are reversed in phase. Namely, the right and left signals are recorded in a manner to cause the crest and root of the wave form thereof to be in reversed relationship with respect to the polarity, namely, in such a way that supposing the root portion of the wave form of the right signal recorded in the outer peripheral wall of the sound groove of said phonographic disk has a positive polarity and the crest portion of said wave form has a negative polarity. Then conversely, the crest portion of the wave form of the left signal recorded in the inner peripheral wall of the sound groove has a positive polarity and the root portion of said wave form has a negative polarity.

There is now described the case where the pickup device of the present invention is used in the aforementioned stereophonographic disk. When the wave form of the right signal recorded in the outer peripheral wall of the sound groove of said phonographic disk is shifted to the root position, and the vibration of the second light control member 16 changes to the R–R′ direction, then the slits $22_1$, $22_2$ and $22_3$ of said member are superposed on the corresponding slits $20_1$, $20_2$ and $20_3$ of one 14 of the first light control members to increase the superposed area and consequently the amount of light beams projected therethrough on one 12 of the photoelectric converting elements. On the other hand, when the wave form of the left signal recorded in the inner peripheral wall of the sound groove changes to the crest position and the vibration of the second light control member 16 varies to the L–L′ direction, then the slits $23_1$, $23_2$ and $23_3$ of said member are superposed on the corresponding slits $21_1$, $21_2$ and $21_3$ of the other first light control member 15 to increase the superposed area and as a result the amount of light beams projected therethrough on the other photoelectric converting element 13. That is, when the wave form of the right signal is shifted to the root position, the amount of light beams projected on one photoelectric converting element 12 increases and when the wave form of the left side signal is conversely shifted to the crest position, the amount of light beams projected to the other photoelectric converting element 13 increases. Thus at the stage where light beams are not yet converted to electric signals, the phase of one of the right and left signals can be reversed with respect to that of the other.

The foregoing description relates to the case where only the right or left signal is recorded in the sound groove. There will now be described the case where both right and left signals are recorded therein at the same time.

Where the crest portion of the wave form of one of the right and left signals is disposed opposite to the root portion of the other, that is, both signals are coordinated to the same polarity, the second light control member 16 vibrates with the vibration system in the direction of H composed of the directions of R and L′ and in the direction of H′ composed of the directions of R′ and L (FIG. 5). When vibrations take place in such directions, the areas defined by the superposition of the slits facing both photoelectric converting elements 12 and 13 respectively increase or decrease alike, so that the amount of light beams projected on both photoelectric converting elements 12 and 13 also increase or decrease alike. Speaking of the crest-root relationship with respect to polarity between the wave forms of the right and left recorded signals, one of these signals is reversed in phase at the stage where only the amount of light beams is varied. Namely, the electric right and left signals obtained from both photoelectric converting elements 12 and 13 respectively are coordinated to the same polarity with the resultant agreement with the polarity relationship between the right and left recorded signals.

There will now be described the case where the crest and root of the wave form of one of the right and left signals recorded in the sound groove are respectively set opposite to those of the other, namely, the polarities of these signals are reversed. Then the second light control member 16, as well as the vibration system, vibrates in the direction of V composed of the directions of R and L and in the direction of V′ composed of the directions of R′ and L′. When vibrations occur, in such directions, the areas defined by the superposition of the slits facing the photoelectric converting elements 12 and 13 respectively increase or decrease in reverse relationship, so that the amount of light beams projected on both photoelectric converting elements 12 and 13 increase or decrease similarly in reverse relationship. Thus the right and left electric signals obtained from the photoelectric converting elements 12 and 13 respectively, are reversed in polarity with the resultant agreement with the polarity relationship between the right and left recorded signals.

What is claimed is:

1. A photoelectric pickup device comprising:

a light source;

a pair of light detecting means disposed opposite said light source;

first and second light control members interposed between said light source and said light detecting means, each of said light control members having first and second light transmitting sets, each set including at least one slit, the transverse direction of the slit of said first set of each light control member intersecting that of said second set at substantially right angles, the lower part of the slit of said first set of said first member superposing the upper part of the slit of said first set of said second member thereby providing one superposed area, and the upper part of the slit of said second set of said first member superposing the lower part of the slit of said second set of said second member thereby providing another superposed area, whereby light beams from the light source pass through the respective superposed area to said light detecting means;

vibration transmitting means coupled to said second light control member; and vibration transmitting medium means coupled to said vibration transmitting means to pick up a signal recorded in a phonographic disk by tracing the sound groove formed therein, to cause said second light control member to vibrate in accordance with said picked up recorded signals.

2. A photoelectric pickup device according to claim 1 wherein each of said light transmitting sets comprises a plurality of slits whose longitudinal sides are disposed substantially parallel to each other.

References Cited

UNITED STATES PATENTS

| | | | |
|---|---|---|---|
| 3,325,603 | 6/1967 | Rabinow | 179—100.41 |
| 3,261,925 | 7/1966 | Smith | 179—100.41 |

FOREIGN PATENTS

| | | |
|---|---|---|
| 679,100 | 4/1930 | France. |

JAMES W. MOFFITT, Primary Examiner

J. ROSENBLATT, Assistant Examiner